Patented Sept. 26, 1950

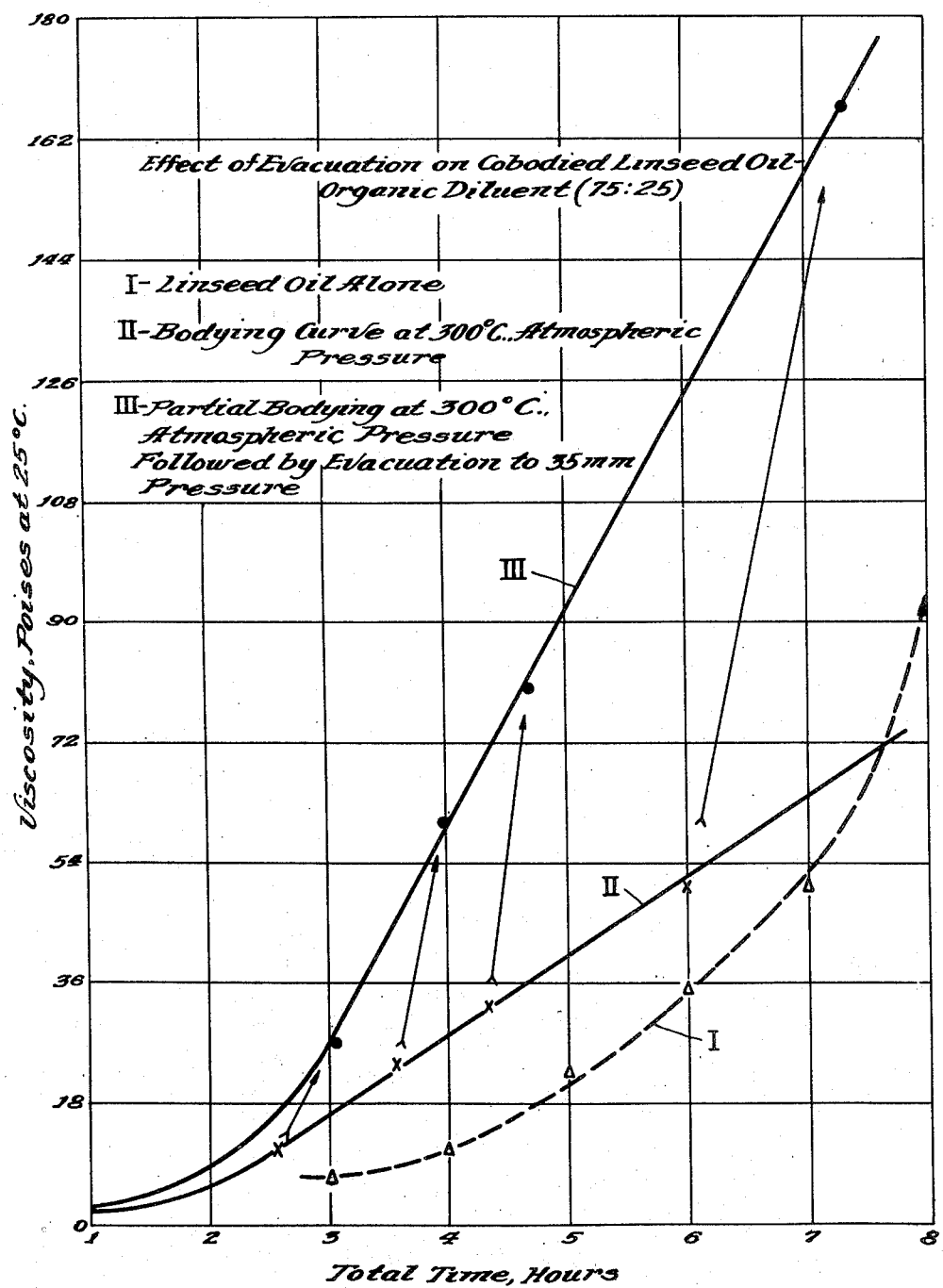

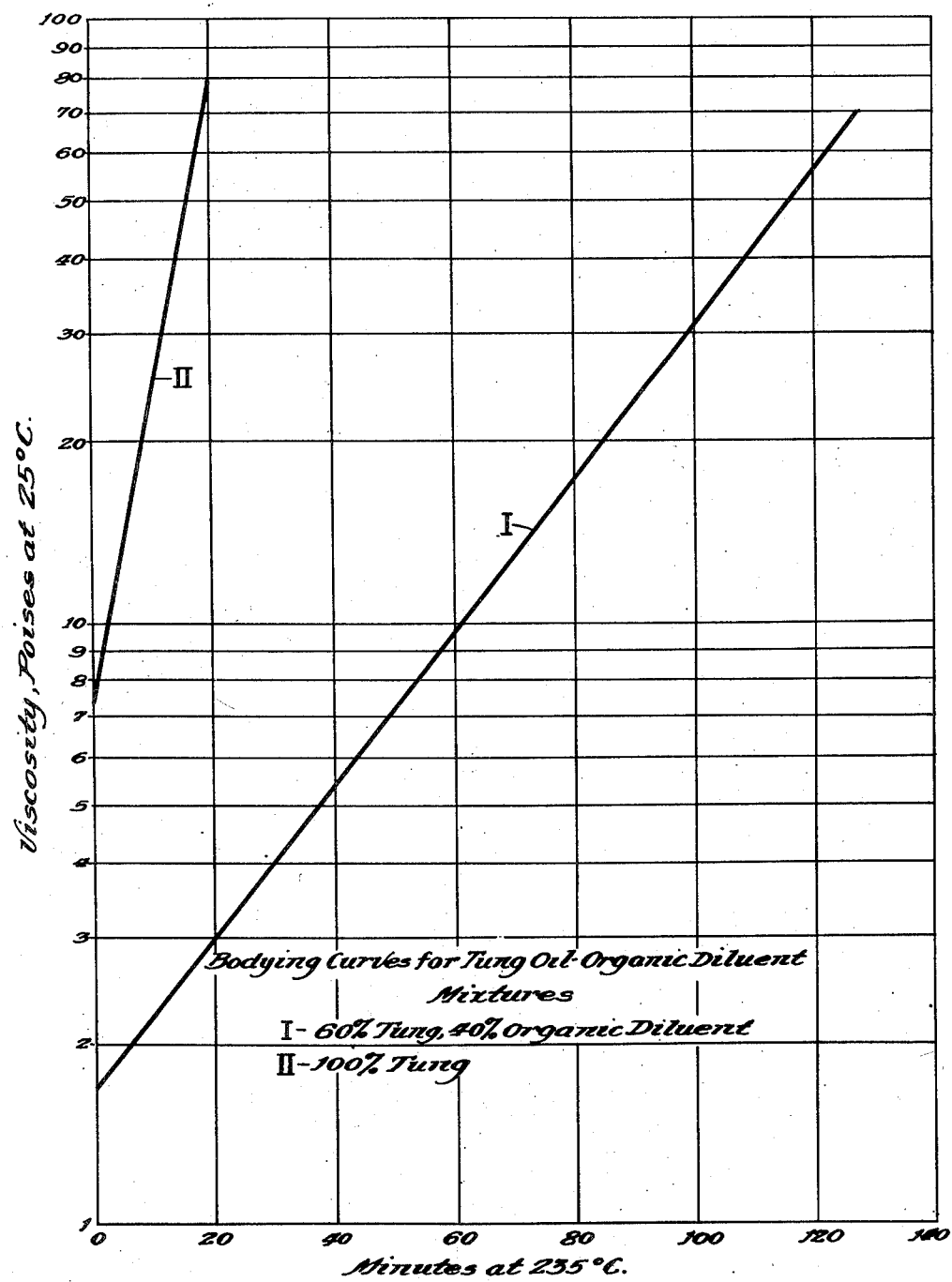

2,523,609

UNITED STATES PATENT OFFICE 2,523,609

COBODIED DRYING OILS

Herman S. Bloch and Alfred E. Hoffman, Riverside, Ill., assignors to Universal Oil Products Company, Chicago, Ill., a corporation of Delaware Application June 29, 1944, Serial No. 542,769

10 Claims. (Cl. 260—407)

This invention relates to new and improved drying oil compositions and to the manufacture of such drying oils.

More specifically, our invention is directed to a drying oil prepared by cobodying a glyceride oil of animal or vegetable origin and a synthetic oil prepared by treating petroleum hydrocarbons.

When hydrocarbons are reacted in the presence of a catalyst which promotes conjunct polymerization reactions, under carefully controlled conditions of operation the used catalyst phase can be made to contain valuable organic material including a major proportion of polyolefinic cyclic compounds having a high degree of conjugated unsaturation. This material which can be recovered from the catalyst phase is referred to in the present specification and claims as organic diluent. It is believed that some of the hydrocarbon compounds of the organic diluent are physically entrained or dissolved in the used catalyst while the remainder are in the form of complex compounds with the catalyst.

The organic diluent results from conjunct polymerization and the catalyst employed should therefore be one capable of accelerating the conjunct polymerization reaction. The conjunct polymerization of an olefin includes a series of reactions; namely, the polymerization of an olefin to form a higher molecular weight olefin or cyclic hydrocarbon followed by dehydrogenation of the cyclic hydrocarbon to yield hydrogen atoms and hydrogenation of part of the olefin to paraffin by means of the liberated hydrogen. If the charging stock comprises a paraffinic rather than an olefinic charge, the paraffinic hydrocarbon must first undergo reaction to form olefins before conjunct polymerization can take place. For this reason, if a paraffinic stock is used, it is preferable to employ a highly branched chain paraffin material which undergoes conversion to olefinic material much more rapidly than will a normal paraffin. Even if conditions and a catalyst are employed which will form a catalyst phase with a normal paraffin charge, the organic diluent recovered from the catalyst phase may contain little or no material having the desired conjugated olefinic unsaturation. When a catalyst such as aluminum halide, hydrogen fluoride or sulfuric acid is employed, the saturated material produced during the conjunct polymerization reaction forms an upper layer while the highly unsaturated material combines with the catalyst in a lower layer from which the organic diluent employed in our invention is recovered.

We have found that when the organic diluent, which in itself possesses the properties of a drying oil, is combined with a natural drying oil such as linseed oil, tung oil, soy bean oil, etc., the resulting product has greatly improved properties and consequently increased utility in paints, coating compositions, varnishes, etc.

An object of this invention is to prepare a new type of drying oil whose chief components are a natural glyceride oil and the cyclic, polyolefinic material present in organic diluent recovered from certain types of catalyst-hydrocarbon complexes.

Another object of our invention is to provide an improved method for effecting the cobodying of a natural glyceride oil and organic diluent which contains a major proportion of polyolefinic cyclic material.

The thermal treatment of drying oils or mixtures containing drying oils to effect partial polymerization thereof to form a product of increased viscosity is well known. Our invention, however, relates to a new cobodied drying oil of which the components are a natural oil and a drying oil material prepared by the catalytic treatment of petroleum hydrocarbons. An additional feature of this invention comprises an improved method of effecting the bodying treatment so that the final product has superior properties and increased utility. Oils bodied according to our process have improved drying characteristics, becoming tack-free in shorter time, are improved in color and, in general, have better compatibility with resinous materials and form improved varnishes, paints and coating preparations.

We have also found that the time consumed in bodying the organic diluent-glyceride oil mixture to the desired viscosity may be considerably decreased by a method which involves the following steps. The drying oil mixture is first partially bodied, preferably in the absence of oxygen, by heating it to a temperature of from about 235 to about 350° C. By carrying this step out carefully the original color of the mixture remains substantially unaltered. The mixture is then subjected to further treatment under a vacuum, for example at an absolute pressure of about 35 mm., whereby a large increase in viscosity is obtained. Relatively large savings in bodying time are effected over a wide range of viscosities when employing the evacuation procedure. This advantage is illustrated in Figure 1 which shows the effect of evacuation on cobodied linseed oil-organic diluent (75:25).

The broken-line curve (1) shows the increase in viscosity when heating linseed oil alone at a temperature of 300° C. and atmospheric pressure. Curves II and III illustrate the increase in bodying rate of a mixture of organic diluent and linseed oil and also show the viscosity increase effected by evacuation. For example, a mixture of the oils heated for 4 hours at atmospheric pressure had a viscosity of about 27-28 poises. The mixture was then evacuated during one hour to 35 mm. pressure and had a final viscosity of over 90 poises. The time coordinate for curve III represents the total time for bodying at atmospheric pressure plus the evacuating time. Therefore to reach any final viscosity, it is possible to use any number of combinations of times during which bodying is partially effected by heating at atmospheric pressure and completed by evacuation. In addition to thermal bodying, the mixture of drying oils may also be subjected to air-blowing which comprises passing very small bubbles of air into the mixture of oils at moderately elevated temperatures. The air-blowing treatment has the effect of both oxidation and polymerization and results in an oil of higher luster and improved flowing properties.

As an alternate method to the thermal procedure for preparing the cobodied drying oil, the treatment may be effected catalytically. Suitable catalysts include acids such as sulfuric, boric, phosphoric, fluorosulfonic; acidic gases such as hydrogen chloride or sulfur dioxide; metal halides, and particularly those of the Friedel-Crafts type, such as aluminum chloride, iron chloride, zirconium chloride, zinc chloride, etc.; such non-metallic halides as antimony halides and boron fluorides and certain organic compounds including amines, alkyl phosphates and sulfates, aryl sulfonic acids, polycyclic aromatic compounds such as naphthaquinone, anthraquinone, anthracene, phenanthrene, naphthols, etc.

By the use of such catalysts, the glyceride oil and organic diluent may be cobodied at lower temperatures and in less time than required for thermal bodying and the bodied oil, after removal of catalyst when necessary, tends to be lighter in color than the thermally treated oil.

The cobodied drying oil may be prepared according to the following procedure which also describes a method of manufacturing organic diluent. This description is not intended, however, to limit the invention as the preparation of the cobodied oils will vary somewhat depending upon the hydrocarbon charging stock and catalyst used to prepare the organic diluent and the glyceride oil selected.

The organic diluent employed in preparing the cobodied oil of the present invention may be secured in a number of different ways. For example, it may be derived from the catalyst phase formed in such processes as the alkylation of an isoparaffin with an olefin or other alkylating agent, the polymerization of normally gaseous or normally liquid olefins, the alkylation of aromatics, etc. The organic diluent may best be prepared, however, by treating an olefin-containing charging stock which is substantially free from aromatics with a catalyst such as hydrogen fluoride, an aluminum halide, sulfuric acid or the like. Although the reaction conditions under which a catalyst phase is formed which contains the desired polyolefinic cyclic compounds vary over a rather wide range, they must be carefully controlled. As the temperature increases, the organic diluent contains less material having conjugated olefinic unsaturation and more compounds which are aromatic in character until finally the mixture of compounds becomes coke-like. Even at moderate temperatures, this undesirable drop in the amount of conjugated unsaturated material present occurs, if the reaction is continued for excessive periods of time. When employing hydrogen fluoride as the catalyst, reaction temperatures will range from about 20 to about 95° C. With aluminum chloride, temperatures from about 25 to about 125° C. are preferred, while with sulfuric acid the temperature used is generally slightly lower than for aluminum chloride because of the oxidizing effect of sulfuric acid at the higher temperatures.

In general, the organic diluent comprises a series of high molecular weight cyclic compounds, of wide boiling range but homologous structure, of which a large portion contains conjugated olefinic double bond systems, although the exact composition of the organic diluent will vary somewhat depending upon the particular charging stock, the catalyst, and the conditions of operation employed. The material has a wide boiling range of about 150 to over 450° C., density of about 0.83 to about 0.93, index of refraction of about 1.47 to about 1.53 (but usually 1.48 to 1.50), specific dispersion of about 125 to about 175 (but usually between 135 and 145), bromine number above about 140 (although it may vary considerably with the average molecular weight), maleic anhydride values of about 30 to about 90 (usually in the range of about 45 to 75), acid number below 3, and average number of olefinic double bonds per molecule varying between about 2.5 and about 4, of which from about 40 to about 70 per cent are conjugated. The organic diluents range in average molecular weights from about 200 to about 400, although the usual average is in the neighborhood of 300. Organic diluent fractions comprising compounds having molecular weights of as low as about 150 to as high as about 1000 have also been prepared. Although hydrogen to carbon atomic ratios of organic diluent vary somewhat depending upon the particular source of the material, for an organic diluent derived from a hydrogen fluoride catalyst phase, they range from about 1.67 to about 1.72 (for the various fractions) with the actual percentages of hydrogen varying from about 12.35 to 12.6. In the case of organic diluent recovered from an aluminum chloride catalyst phase the hydrogen to carbon atomic ratios range from about 1.58 to about 1.72 with the actual percentage of hydrogen averaging about 12.4.

The properties of the organic diluent will, of course, vary somewhat depending upon whether the entire boiling range of material or a specific fraction is employed. In general, the lower boiling fractions have similar properties regardless of the particular catalyst phase from which they are derived. The higher boiling fractions differ more widely, those derived from a hydrogen fluoride catalyst phase being substantially non-aromatic and partly bi- or di-cyclic, while those derived from catalyst complexes formed in reactions involving such catalysts as aluminum chloride, or sulfuric acid, contain a certain amount of aromatic hydrocarbons. More desirable final products are sometimes obtained by using distillate fractions of the organic diluent. The distillation may be either vacuum, steam or atmospheric, the latter being carried out very rapidly. Although the present specification and claims are directed primarily to the use of the entire boiling range of material, it is to be understood that the treatment described also covers the use of specific fractions.

In one method of making organic diluent, a hydrocarbon charge containing normally gaseous and/or normally liquid olefins is treated in the presence of hydrogen fluoride under sufficient pressure to maintain the mixture in substantially liquid phase, said pressure usually being below about 500 pounds per square inch. Intimate contact between the hydrocarbons and catalyst may be maintained by some form of agitation such as mixing, stirring, etc., so as to form a mixture or emulsion of hydrocarbon and hydrogen fluoride. A reaction temperature of from about 0 to about 300° F. and preferably from about 50 to about 200° F. is usually employed. Upon completion of the reaction, the products are allowed to settle and a hydrocarbon layer is separated from the catalyst layer which comprises chiefly acid and/or organic diluent. The catalyst phase is then directed to an acid recovery zone wherein hydrogen fluoride is separated by distillation, treatment with water and/or aqueous alkali or other suitable means. The hydrogen fluoride may be reused in the process.

The material remaining after removal of hydrogen fluoride may be treated in a number of ways to remove any residual free acid left and to obtain a purified organic diluent. A simple method comprises either steam or vacuum distillation. Alternatively, the purified organic diluent may be recovered by commingling the catalyst layer with water which serves to dissolve any free acid present, while the organic diluent rises to the top of the mixture and may be withdrawn. If desired, the fluidity of the catalyst layer may be increased by commingling it with a non-reactive hydrocarbon solvent such as pentane and after thorough mixing, the solution is treated with a suitable alkaline reagent to neutralize any remaining free acid present. The treated mixture is directed to a separation zone in which the hydrocarbon solvent is removed by means such as distillation and the organic diluent recovered.

For the cobodying treatment, organic diluent is combined with a natural glyceride oil which may be either a drying oil such as linseed, hempseed, chia, fish oils, (menhaden, sardine, salmon, herring and seal), oiticica, perilla, poppyseed, safflower, tung, walnut, dehydrated castor oil, etc.; more slowly drying oils such as soy bean oil, sunflower, rapeseed, etc.; semi-drying oils such as cottonseed, corn oil, etc. Useful compositions can also be obtained by heating together organic diluent with certain non-drying oils such as castor oil, olive oil, peanut oil, neat's-foot oil, whale oil, etc. Extracts of the drying oils hereinabove named, such as those made by separating the naturally occurring oils into components of greater or lesser unsaturation as for example, by furfural extraction, may also be employed. The mixture is heated to a temperature varying between about 235 to about 350° C. until partial bodying has been effected. The mixture may then be subjected to further treatment by reducing the pressure to about 35 mm. and continuing the bodying treatment until the viscosity reaches the desired point. A preferable mode of operation, however, is to continue the atmospheric pressure bodying for a length of time such that evacuation will yield a bodied oil of the desired viscosity without further heating in vacuo. The ratio of organic diluent to natural oil employed may vary over a wide range depending upon the type of final product desired.

The cobodied oil is suitable for use in varnish compositions, paints and enamels, resinous coatings and similar products.

The following examples are introduced to illustrate our invention but are not to be considered as limiting the generally broad scope of the invention in accordance with the data submitted.

EXAMPLE I

A mixture of organic diluent recovered from the catalyst phase prepared by reacting a polymer gasoline with hydrogen fluoride according to the procedure discussed in the specification was cobodied at a temperature of 300° C. with varying amounts of linseed oil. After partial bodying had been effected the pressure was reduced and the bodying completed. In 6 hours of heating a viscosity was reached which would have required at least 30 hours without evacuation or about 9.5 hours with linseed oil alone. The following table shows the viscosity of the bodied oil at 25° C. and the composition which gives this viscosity in a minimum time. Comparative times are also shown for bodying linseed oil alone and the percentage of organic diluent below which the mixtures still body more rapidly than linseed oil alone.

*Cobodied organic diluent-linseed oil*

| Visc. of Bodied Oil 25° C., Gardner-Holdt, Poises | Composition which gives this Visc. in Minimum Time Vol. Percent Organic Diluent | Minimum Time, Percent of Time Required for Linseed Oil Alone | Percent of Organic Diluent Below Which All Mixtures Body More Rapidly Than Linseed Oil Alone |
|---|---|---|---|
| Z5, 98 | 10 | 82 | 21 |
| Z2, 36 | 22 | 66 | 39 |
| Z, 22.7 | 25 | 59 | 43 |
| W, 10.7 | 25 | 53 | 66 |
| N, 3.4 | 25 | 45 | 78 |

EXAMPLE II

A comparison of the bodying times at 300° C. of linseed oil alone and a cobodied mixture of 75% of linseed oil and 25% of organic diluent is shown in the following table. These figures also illustrate the bodying times required without employing the evacuation method and with evacuation.

*Comparison of bodying times at 300° C. linseed oil vs. 75 linseed oil:25 organic diluent*

| Final Viscosity, Poises @ 25° C. | Bodying Time of Mixture, Percent of Time Required for Linseed Oil Alone | |
|---|---|---|
| | Without Evacuation | With Evacuation |
| 12 | 64 | 55 |
| 24 | 67 | 56 |
| 36 | 77 | 53 |
| 48 | 84 | 54 |
| 60 | 91 | 55 |
| 72 | 100 | 57 |

EXAMPLE III

A mixture of 60 volumes of tung oil and 40 volumes of organic diluent were cobodied at 235° C. and the bodying times compared with that of tung oil alone at the same temperature. The results indicate that the mixture bodies more slowly than tung oil alone, which is an advantage in that the rapid gelation of tung oil in varnish cooking often results in spoiled varnish batches. The slower bodying rate permits an advantageous use of tung oil and at the same time yields a less expensive drying oil. Figure 2 shows bodying curves for tung oil alone and cobodied mixtures of tung oil and organic diluent. Curve I shows the viscosity in poises at different stages of bodying of a mixture comprising 60% of tung oil and 40% or organic diluent. Curve II shows the effect of bodying tung oil alone and the rapid rise in viscosity to a point of gelation.

EXAMPLE IV

A mixture of castor oil and organic diluent was heated at a temperature of 300° C. The mixture which contained 60 parts of castor oil to 40 parts of organic diluent bodied steadily and more slowly than castor oil alone and reached a viscosity of 104 poises in 10 hours.

EXAMPLE V

A mixture of 60 volumes of soy bean oil and 40 volumes of organic diluent was heated to a temperature of 286 to 295° C. for 18 hours in an atmosphere of carbon dioxide. During this period the viscosity increased from less than 0.5 poise to 9.0 poises.

We claim as our invention:

1. A drying oil composition consisting essentially of the copolymer of a natural unsaturated glyceride oil and a hydrocarbon fraction having drying oil properties, said fraction containing a major proportion of polyolefinic cyclic hydrocarbons and having an average molecular weight of from about 200 to about 400, a bromine number above about 140, and an average of from about 2.5 to about 4.0 olefinic double bonds per molecule of which from about 40 to about 70 per cent are conjugated.

2. A drying oil composition consisting of essentially of the copolymer of a natural unsaturated glyceride oil and a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

3. A drying oil composition consisting essentially of the copolymer of a natural glyceride drying oil and a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

4. A drying oil composition consisting essentially of the copolymer of linseed oil and a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

5. A drying oil composition consisting essentially of the copolymer of a natural glyceride semi-drying oil and a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

6. A drying oil composition consisting essentially of the copolymer of a natural glyceride non-drying oil and a hydrocarbon fraction having drying oil properties, said fraction containing a major proportion of polyolefinic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

7. A drying oil composition consisting essentially of the copolymer of castor oil and a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average number of olefinic double bonds per molecule of from about 2.5 to about 4.0 of which from about 40 to about 70 per cent are conjugated.

8. A process for copolymerizing natural glyceride oils which comprises commingling a natural unsaturated glyceride oil with a hydrocarbon fraction having drying oil properties, said fraction containing a major proportion of polyolefinic cyclic hydrocarbons and having an average molecular weight of from about 200 to about 400, a bromine number above about 140, and an average of from about 2.5 to about 4.0 olefinic double bonds per molecule of which from about 40 to about 70 per cent are conjugated; heating the mixture to a temperature of from about 235° C. to about 350° C. at atmospheric pressure in the absence of a catalyst to effect partial bodying thereof; reducing the pressure below atmospheric; and completing the non-catalytic bodying of the mixture under reduced pressure.

9. A process for copolymerizing natural glyceride oils which comprises commingling a natural glyceride drying oil with a hydrocarbon fraction having drying oil properties, said fraction containing a major proportion of polyolefinic cyclic hydrocarbons and having an average molecular weight of from about 200 to about 400, a bromine number above about 140, and an average of from about 2.5 to about 4.0 olefinic double bonds per molecule of which from about 40 to about 70 per cent are conjugated; heating the mixture to a temperature of from about 235° C. to about 350° C. and at atmospheric pressure in the absence of a catalyst to effect partial bodying thereof; reducing the pressure below atmospheric; and completing the non-catalytic bodying of the mixture under reduced pressure.

10. A process for copolymerizing natural glyceride oils which comprises commingling a natural unsaturated glyceride oil with a hydrocarbon fraction having drying oil properties, said fraction containing a major proportion of polyolefinic cyclic hydrocarbons and having a boiling range of from about 150° C. to about 450° C., a density of from about 0.83 to about 0.93, an index of refraction of from about 1.47 to about 1.53, a specific dispersion of from about 125 to about 175, an average molecular weight of from about 200 to about 400, a bromine number above about 140, an acid number below 3, and an average of from about 2.5 to about 4.0 olefinic double bonds per molecule of which from about 40 to about 70 per cent are conjugated; heating the mixture to a temperature of from about 235° C. to about 350° C. at atmospheric pressure in the absence of a catalyst to effect partial bodying thereof; reducing the pressure below atmospheric; and completing the non-catalytic bodying of the mixture under reduced pressure.

HERMAN S. BLOCH.
ALFRED E. HOFFMAN.

REFERENCES CITED

The following references are of record in the file of this patent:

UNITED STATES PATENTS

| Number | Name | Date |
|---|---|---|
| 2,168,271 | Perquin et al. | Aug. 1, 1939 |
| 2,253,323 | Christmann | Aug. 19, 1941 |
| 2,329,397 | D'Ouville et al. | Sept. 14, 1943 |
| 2,361,018 | Gerhart | Oct. 24, 1944 |
| 2,390,530 | Gerhart | Dec. 11, 1945 |
| 2,397,600 | Gerhart | Apr. 2, 1946 |
| 2,397,611 | Gerhart | Apr. 2, 1946 |
| 2,401,865 | Gorin et al. | June 11, 1946 |

OTHER REFERENCES

Bruson et al.: Ind. Eng. Chem., 18, 381–383 (1926).

Bailey: Ind. Oil & Fat Prods., Interscience Publishers Inc., page 687, 1945.